United States Patent
Kurth et al.

(10) Patent No.: US 9,284,863 B2
(45) Date of Patent: Mar. 15, 2016

(54) VALVE STEM SEAL

(71) Applicants: Juergen Kurth, Odenthal (DE);
Juergen Netzer, Burscheid (DE)

(72) Inventors: Juergen Kurth, Odenthal (DE);
Juergen Netzer, Burscheid (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 13/628,271

(22) Filed: Sep. 27, 2012

(65) Prior Publication Data

US 2013/0082203 A1    Apr. 4, 2013

(30) Foreign Application Priority Data

Sep. 29, 2011    (DE) .......................... 10 2011 083 743

(51) Int. Cl.
*F01L 3/08* (2006.01)
*F16K 1/32* (2006.01)
*F16K 41/04* (2006.01)

(52) U.S. Cl.
CPC ... *F01L 3/08* (2013.01); *F16K 1/32* (2013.01); *F16K 41/04* (2013.01)

(58) Field of Classification Search
CPC ......... F16K 41/02; F16K 41/08; F16K 41/06; F01L 3/08; F01L 7/16; F16J 15/3268; F16J 15/3276; F16J 15/3248
USPC ................ 251/214, 337; 277/502; 123/188.6
See application file for complete search history.

(56) References Cited

U.S. PATENT DOCUMENTS

| | | | | |
|---|---|---|---|---|
| 4,993,379 A | * | 2/1991 | Viazzi ........................... | 277/502 |
| 5,237,971 A | * | 8/1993 | Worsley ........................ | 277/502 |
| 5,775,284 A | * | 7/1998 | Kirchner et al. ........... | 123/188.6 |
| 6,394,463 B1 | * | 5/2002 | Otani ............................ | 277/502 |
| 6,938,877 B2 | * | 9/2005 | Mc Arthy et al. ............. | 251/214 |
| 7,025,030 B2 | * | 4/2006 | Leimer ....................... | 123/188.6 |
| 7,438,036 B2 | * | 10/2008 | Hesher et al. .............. | 123/90.37 |
| 7,654,537 B2 | * | 2/2010 | Scarano ........................ | 277/502 |
| 7,862,048 B2 | * | 1/2011 | Scarano ........................ | 277/502 |
| 8,011,669 B2 | * | 9/2011 | Sakata et al. .................. | 277/502 |
| 2005/0001196 A1 | | 1/2005 | Mc Arthy et al. | |
| 2007/0022997 A1 | * | 2/2007 | Lantelme ................... | 123/188.6 |
| 2008/0157480 A1 | * | 7/2008 | Scarano ........................ | 277/402 |
| 2008/0157482 A1 | * | 7/2008 | Zoppi .......................... | 277/502 |
| 2009/0256315 A1 | * | 10/2009 | Hamamoto ................... | 277/502 |
| 2012/0267861 A1 | * | 10/2012 | Sakata .......................... | 277/502 |
| 2013/0015625 A1 | * | 1/2013 | Hegemier et al. ............. | 277/502 |
| 2013/0200574 A1 | * | 8/2013 | Hegemier et al. ............. | 277/502 |

FOREIGN PATENT DOCUMENTS

DE    2943524 C2    7/1982
EP    1939413 A1    7/2008

* cited by examiner

*Primary Examiner* — John K Fristoe, Jr.
*Assistant Examiner* — Andrew J Rost
(74) *Attorney, Agent, or Firm* — Bryan Peckjian; SKF USA Inc. Patent Dept.

(57) ABSTRACT

A valve stem seal (1) seals a valve stem (4) that is reciprocally movable in an axial direction. The valve stem seal includes a base body (8) that is connectable with a valve stem guide (6). A first seal lip (10) is resiliently positioned relative to the base body via an elastic connection (16) and seals the valve stem relative to an oil chamber (24). A second seal lip (12) is spaced in the axial direction (2) from the first seal lip and seals the valve stem relative to a gas chamber. The second seal lip is also resiliently positioned relative to the base body via the elastic connection.

20 Claims, 1 Drawing Sheet

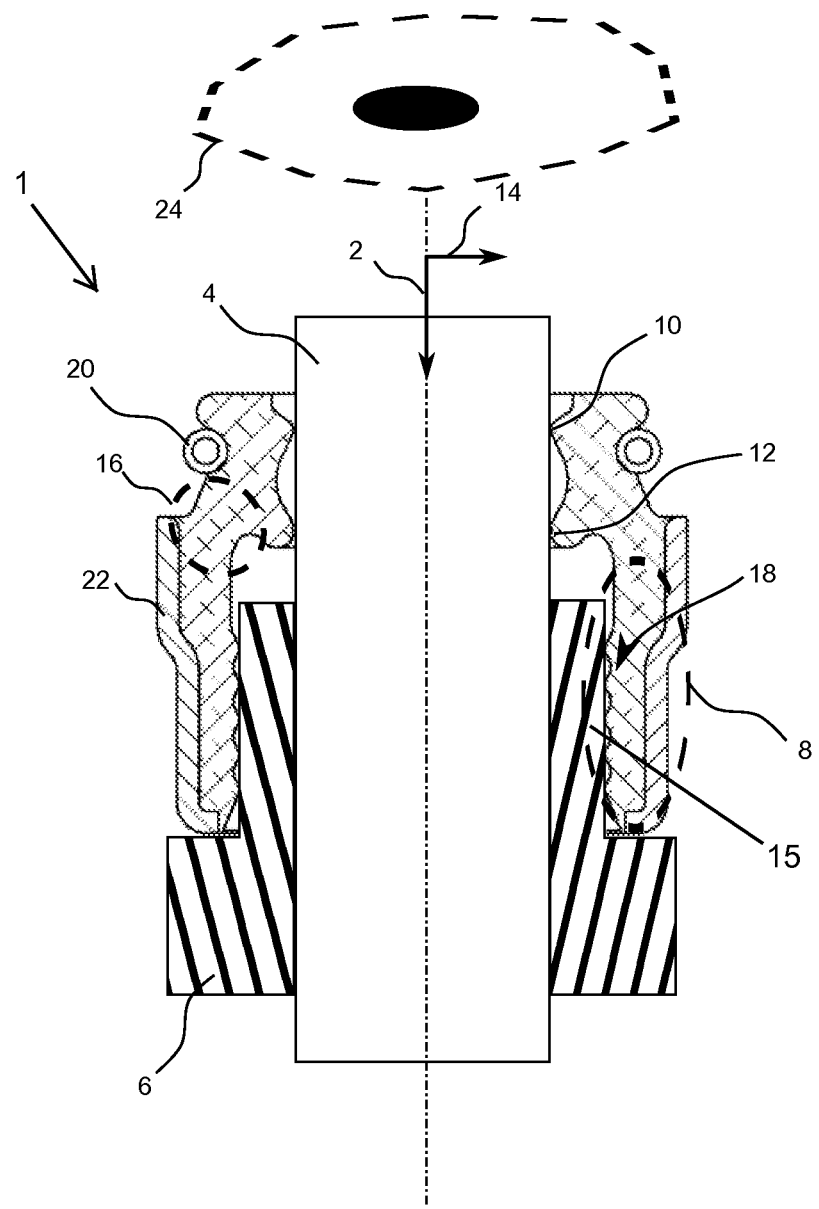

VALVE STEM SEAL

CROSS-REFERENCE

This application claims priority to German patent application no. 10 2011 083 743.4 filed on Sep. 29, 2011, the contents of which are fully incorporated herein by reference.

TECHNICAL FIELD

The present invention generally relates to valve stem seals, which may be advantageously utilized, e.g., in internal combustion engines, e.g., for automobiles, aircraft, ships, generators, etc.

BACKGROUND

Valve stem seals are used in a variety of internal combustion engines, for example in automobiles, in trucks, or in motorcycles, and serve to keep oil, which lubricates the camshaft, etc., and is circulating within the space defined by the valve head and valve cover, away from the combustion chamber and the intake system, as well as to prevent exhaust gas or pressurized fuel mixture from leaking into the space within the valve cover.

Due to the increased use of turbo chargers and compressors in automobiles, the number of applications has also increased in which the gas pressure on the side of the valve or valve stem seal facing towards the cylinder is significantly greater than the ambient pressure normally prevailing within the valve cover. In such applications, there is increased risk of "blow-by," i.e. gas that leaks around the valve stem guide into the space within the valve cover and thereby impairs the lubrication of the valve. Conventional valve stem seals usually have a single seal lip for sealing the valve seat or the intake or exhaust region relative to the oil chamber of the valve cover. Therefore, "blow-by" can be caused, for example, by the large pressure difference therebetween that lifts the seal lip away from the valve stem during operation.

Previous solutions for eliminating "blow-by" have increased the elastic or spring force that presses the seal lip for sealing the oil chamber against the valve stem, in order to better prevent the seal lips from lifting away from the valve stem during operation. However, these solutions are disadvantageous, because the increased pressing force also causes increased friction, thereby resulting in undesirable power losses and increased wear caused by the increased friction.

In addition, previous solutions for preventing blow-by have provided a second seal lip for sealing the valve stem relative to the gas-filled volume of the intake or exhaust system. In such solutions, the seal lip for sealing the gas chamber is supported on an inflexible support element, which, in order to withstand the gas pressure, concentrically surrounds the valve stem seal and connects the valve stem seal with the seal seat. However, this only allows the seal lip to compensate for a small radial play. Moreover, even if only a small radial play or misalignment between the valve stem and the valve stem guide exists, blow-by can still result.

SUMMARY

Therefore, it is an object of the present teachings to disclose improved valve stem seals and/or techniques for overcoming one or more of the above-described problems.

In one aspect of the present teachings, a valve stem seal is provided for sealing a valve stem that is movable in a radial direction relative to a valve stem guide. A base body (base) of the valve stem seal is fixedly or immovably connectable to the valve stem guide and is elastically connected with a first seal lip configured to seal the valve shaft relative to an oil chamber. A second seal lip is also elastically connected with the base body and is configured to provide a seal relative to a gas chamber. The second seal lip is spaced from the first seal lip in the axial direction of the valve stem. As will be understood, each of the base body, first seal lip, second seal lip and elastic connection (bridge) connecting the base body to the first and second seal lips are annular structures (i.e., they each have a hollow circular cross-section in the radial direction of the valve stem).

In this aspect, the combination of the elastic (bendable) connection of the two seal lips relative to the base body of the seal and the fixed or immovable connection of the base body with the valve stem guide allows the valve stem to move in the radial direction during operation (i.e. radial play between the valve stem and the valve stem guide is permitted to a certain degree) without the seal lips lifting away from the valve stem, which could cause "blow-by" to occur. Moreover, as compared to previously-known solutions, designs according to the present teachings allow or enable the contact pressure applied to the seal lip, which seals the valve stem relative to the oil chamber, to be reduced. This in turn leads to a reduction of wear as well as to significantly lower friction losses.

The term "seal lips" should be understood here and in the following to mean any geometric shape of a flexible or inflexible material suitable for use as a seal, i.e. which is suitable to perform a sealing function relative to a surface of another component that is directly adjacent to the seal lip. In particular, this concerns the region of a seal that comes into contact with or is designed to come into contact with the directly adjacent component.

In another aspect of the present teachings, the base body, the seal lips and the elastic connection may all be manufactured as one integral piece from one seal material, i.e. with no seams therebetween. In this case, the elastic or spring effect of the elastic connection is effected, at least in part, by the geometric shape of the seal material in the area of the elastic connection or element. For example, the two seal lips can be connected with the base body via a common bridge of elastic material. In this case, the material thickness of the bridge may be suitably dimensioned so as to allow a certain amount of flexibility or movement of the two seal lips in the radial direction. The preferred amount of flexibility or movement will typically depend upon the specifications of each particular application, such as the pressure difference across the valve stem seal, the temperature conditions of the seal environment, the physical properties of the material used to form the valve stem seal, the size of the seal, etc.

In another aspect of the present teachings, the second seal lip functions as a seal relative to a gas chamber (e.g., a combustion chamber or a cylinder of an internal combustion engine) and may be disposed on an arm extending in the axial direction, i.e. in the direction of the gas chamber. This can lead to the excess pressure in the gas chamber itself contributing, in some cases, to an increase of the contact pressure of the seal lip on the valve stem. At the same time, the arrangement of the seal lip as well as of the arm on the elastic element result in that the seal can also follow or compensate for radial movements or a radial misalignment of the valve stem.

In another aspect of the present teachings, the valve stem seal further includes one or more additional elastic or spring elements, which exert(s) an elastic or spring force onto the first and/or second seal lip in the radially-inward direction, i.e. in the direction towards the valve stem, in order to increase the sealing effect. The valve stem seal may be configured to receive an elastic spring element radially therearound, the valve stem seal may be configured to support the elastic spring element such that it is axially located between the first seal lip and the second seal lip. This elastic or spring force can be lower or less than is usually required, which can reduce wear during operation as compared to previously-known designs.

In another aspect of the present teachings, the base body of the valve stem seal is enclosed, encircled or surrounded by a support element, for example by a cylindrically symmetrical element made from an inelastic or rigid material. In this case, the base body is connected with or fixed to a seal seat portion of the valve stem guide by using this inelastic material (support element). The seal seat portion can be formed as an integral part of the valve stem guide itself or separately from it. In order to also ensure a satisfactory sealing relative to the seal seat portion, in some exemplary embodiments of the present teachings one or more seal lips is (are) provided on the side of the base body facing towards the seal seat of the valve stem guide. A section of the support element that extends from an axial end thereof proximate to the elastic connection to a location proximate the at least one third seal lip may be configured to be perpendicular to the valve stem.

In another aspect of the present teachings, the elastic connection (bridge) extends in the axial direction towards the oil chamber of the valve cover at least partially beyond the maximum extension (terminal end) of the support element in this direction. This configuration increases the flexibility of the valve stem seal and thus improves the gas- or oil tightness of the seal.

Further objects, embodiments, advantages and designs of the present teachings will be explained in the following, or will become apparent, with the assistance of the exemplary embodiments and the appended FIGURE.

BRIEF DESCRIPTION OF THE DRAWINGS

The FIGURE shows a cross-sectional view of an exemplary embodiment of a valve stem seal according to the present teachings.

DETAILED DESCRIPTION OF THE INVENTION

The FIGURE shows an exemplary embodiment of a valve stem seal 1 in the installed state. The valve stem seal 1 seals a valve stem 4 that linearly reciprocally moves in the axial direction 2. The valve is typically actuated by a device, for example a cam, which is disposed at the end of the valve stem 4 in the axial direction 2 that is disposed in the oil chamber. Such valve actuating devices are well known in the art and thus need not be illustrated or further described herein.

The movement of the valve stem 4 in the axial direction 2 opens a valve head (not shown), which is connected to the valve stem 4 at the opposite end in the axial direction 2 from the valve-actuating device. The reciprocal linear movement opens and closes an intake to and/or an exhaust from the combustion (gas) chamber of an internal combustion engine. For the sake of clarity, the valve head and the rest of the mechanical system will not be discussed in further detail, since these parts are also well known in the art.

The valve stem 4 is axially guided in and by a valve stem guide 6, i.e. in and by a component having an inner diameter or bore that is at least substantially matched to the outer diameter of the valve stem 4 (i.e. it is only slightly larger to allow relative movement). The valve stem guide 6 thus functions to define the linear movement path of the valve stem 4. Due to unavoidable manufacturing tolerances, however, a radial misalignment may result between the bore of the valve stem guide 6 and the outer diameter of the valve stem 4. In addition, due to thermal expansion/contraction, the clearance required between the valve stem 4 and the valve stem guide 6 and/or wear, during its linear reciprocal motion, the valve stem 4 may also experience a component of motion in the radial direction 14, which is perpendicular to the axial direction 2, i.e. radial play.

The valve stem seal 1 of the present embodiment is designed to better compensate or handle any such radial movement of the valve stem 4 during its axial (linear) movement.

Therefore, the valve stem seal 1 shown in the cross-sectional view in the FIGURE is comprised of a plurality of individual components that are designed to perform different functions, as will be further discussed below. Some of the individual components in the FIGURE are formed as one piece; in particular, they are made from the same seal material. It should be understood, however, that the different functional components can also be formed as multiple parts, i.e. as discrete or separable parts, in order to provide further exemplary embodiments of a valve stem seal 1 according to the present teachings.

The valve stem seal 1 includes a base body 8, which serves to connect the valve stem seal 1 to the valve stem guide 6. That is, a rigid or axially-immovable connection of the valve stem seal 1 to the valve stem guide 6 is provided via the base body 8. In the exemplary embodiment shown in the FIGURE, the portion of the valve stem seal 1 that forms or defines the base body 8 includes one or more additional seal lips 18 disposed adjacent or opposite to a seal seat 15 of the valve stem guide 6.

These seal lips 18 may be required, e.g., in order to prevent gas (e.g., from the combustion chamber or from the outside environment) pressing against the interface of the valve stem guide 6 and the valve stem 4 from flowing through a gap between the valve stem guide 6 and the valve stem 4. Such a gas flow-through path would be an alternative to the above-described "blow-by" and would be undesirable for the same reasons. The seal lips 18 can also perform the task of holding the valve stem seal 1 securely and/or in a defined position relative to the valve stem guide 6. For this purpose, individual seal lips 18 can also engage into undercuts, grooves or recesses (not shown) defined in the mutually-opposing seal seat 15 of the valve stem guide 6.

Further, the valve stem seal 1 includes a first seal lip 10 disposed axially adjacent to an oil chamber 24 and configured to seal the valve stem 4 relative to the oil chamber 24.

The valve stem seal 1 also includes a second seal lip 12 spaced in the axial direction 2 from the first seal lip 10 and configured to seal the valve stem 4 relative to a gas chamber (e.g., combustion chamber), which is located on the opposite side of the first seal lip 10 in the axial direction to the oil chamber 24. The "gas chamber", which is sealed by the second seal lip 12, can be understood in general to mean any gas chamber located on the side of the second seal lip 12 that faces away from the first seal lip 10 and usually contains a gas at a pressure higher than ambient pressures, such as is found in a combustion chamber (cylinder) of an internal combustion engine. The to-be-sealed gases arrive in or are generated in the gas chamber and could possibly flow through a gap between the valve stem 4 and the valve stem guide 6.

In order to enable the first seal lip 10 and the second seal lip 12 to compensate for any manufacturing tolerances of the valve stem guide 6, as well as to allow for a movement of the valve stem 4 in the radial direction 14, i.e. radial play of the valve stem 4, both the first seal lip 10 and the second seal lip 12 are connected to the base body 8 via an elastic membrane or web 16 which serves as an elastic or resiliently flexible connection. As was noted above, the base body 8 is rigidly or fixedly connected to the valve stem guide 6, preferably so the base body 8 is immovable in both the axial direction 2 and the radial direction 14 relative to the valve stem 4 and valve stem guide 6.

In the exemplary embodiment shown in the FIGURE, the elastic connection 16 is formed from the same seal material as the lips 10, 12, 18 and is defined, at least in part, by its geometric shape. In other words, the connection 16 may be designed as a bridge of the seal material between the lips 10, 12 and the lips 18. That is, the resiliently flexible bridge 16 connects the first seal lip 10 and the second seal lip 12 with the base body 8.

The geometric shape of the bridge 16 is preferably designed to achieve the appropriate amount of elasticity in the radial direction for the particular application, e.g., by suitably dimensioning the material cross-section of the sealing material forming the bridge. It should be understood that alternative elastic connecting elements can be provided in further exemplary embodiments. For example, multiple-part elastic elements that use coil-, leaf-, or bimetallic springs or similar elastic elements could be used in addition or in the alternative to the elastic bridge 16.

In further exemplary embodiments, one-piece valve stem seals, or valve stem seals wherein the elastic connection 16 is made from the seal material, can of course also use different geometries to produce the necessary elastic or flexibly resilient effect in the radial direction. For example the elastic element could be meander-shaped, serpentine-shaped, C-shaped, or formed with any other tapering or narrowing of the cross-section of the material.

The radial play of the valve stem 4 can be compensated by the connection of the two seal lips 10, 12 to the base body 8 via the elastic connection 16, without compromising the sealing effect of the first or second seal lip 10, 12. In the exemplary embodiment shown in the FIGURE, a support element 22 surrounds the base body 8 in a cylindrically symmetric way and is used to fix the base body 8 to the valve stem guide 6. By using the support element 22, the base body 8 (including the seal lips 18) is pressed against a cylindrically symmetrical connecting region (i.e. the seal seat 15) of the valve stem guide 6, in order to achieve a gastight connection between the valve stem seal 1 and the valve stem guide 6.

It should be understood that, in other exemplary embodiments, the connection of the base body 8 to the valve stem guide 6 can be implemented in a variety of other ways.

In addition, in order to further increase the gastightness of the exemplary embodiment shown in the FIGURE, the second seal lip 12 may be further attached to an arm that extends in the axial direction away from the elastic element, or from the bridge 16 serving as the elastic element. In this case, an undercut may be formed or defined between the arm and the base body 8 or the connecting bridge 16. This design would allow any gas located in the gas chamber to press the second seal lip 12 against the valve stem 4 with a greater force, which can improve the sealing effect. In order to achieve a flexible resilient mounting or connection of the seal lips 10, 12, the elastic or spring element 16 preferably extends in the axial direction 2 at least partially beyond the support element 22 in the axial direction towards the oil chamber 24 (i.e. above the support element 22 in the shown embodiment).

In the embodiment shown in the FIGURE a completely-encircling (annular), additional elastic (spring) element 20 (e.g., a garter spring) is provided, in order to provide a defined contact pressure of the first seal lip 10 and/or the second seal lip 12 against the valve stem 4 that is essentially independent of the duration of the usage and the manufacturing tolerances of the seal material. However, it should be understood that, in other embodiments, two or more elastic (spring) elements 20 could be used, or that the elastic element 20 can be omitted. In further embodiments, the geometric position of the further elastic element 20, in particular the position relative to the first seal lip 10 and the second seal lip 20, is chosen in accordance with the requirements of the particular application such that, for example, by using the further elastic element 20 a greater force can be applied to the second seal lip 12 than to the first seal lip 10, or vice versa.

If the outer diameter of the connecting region at which the valve stem seal 1 is connected to the valve stem guide 6 is relatively small compared to the outer diameter of the valve stem 4, the valve assembly shown in the FIGURE enables the usage of a valve stem seal that is both oil-tight and gastight, and which moreover has low wear and friction losses. In other words, a valve stem seal 1 of the above-described type can be especially advantageously used in a valve assembly wherein the ratio of the outer diameter of the valve stem guide 6 (or the connecting region (seal seat 15) of the valve stem guide 6) to the outer diameter of the valve stem 4 is small. For example this ratio may fall within the range of 1.05-1.2:1, or 1.05-1.5:1, or 1.05-2.0:1.

Although the preceding exemplary embodiment is mainly described in the context of an automobile engine, it should be understood that further exemplary embodiments of the present valve stem seals can also be used in any other engines, for example in aircraft engines, ship engines, engines used in generators or even model-making or the like. Moreover these exemplary embodiments are not limited to valve applications. That is, any type of tappets, rods, pistons or the like, which in operation carry out a reciprocal, essentially linear motion, can be sealed relative to both an oil chamber and a gas chamber in an advantageous way by utilizing the present teachings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved valve stem seals and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Valve stem seal
2 Axial direction
4 Valve stem
4 Valve stem guide
6 Base body
8 First seal lip
10 Second seal lip
14 Radial direction
15 Seal seat
16 Elastic connection
18 Further seal lip
20 Further elastic (spring) element
22 Support element
24 Oil chamber

The invention claimed is:

1. A valve stem seal for sealing a valve stem that is movable in an axial direction, the valve stem seal comprising:
    a base body configured to be connected to a valve stem guide that receives and guides the valve stem,
    a first seal lip configured to seal the valve stem relative to an oil chamber such that the first seal lip is oil-tight,
    a second seal lip spaced in the axial direction from the first seal lip in the direction of the base body and configured to seal the valve stem relative to a gas chamber, wherein a first portion of the second seal lip that is configured to contact the valve stem has a radial cross section that is more rounded than a second portion of the first seal lip that is configured to contact the valve stem,
    an elastic connection resiliently connecting the first and second seal lips to the base body, wherein no material is interjected into the elastic connection of the valve stem seal between the base body and the second seal lip, and wherein a radial cross section of the elastic connection defines only a single concave section between the base body and the second seal lip, and
    a support element substantially surrounding the base body of the valve stem seal wherein one of the group of the base body and the combination of the base body and the elastic connection contacts the entire inner surface of the support element, an axial end of the support element proximate to the first seal lip and the second seal lip does not have a radially extending portion that protrudes into another part of the valve stem seal,
    the valve stem seal being configured to receive an elastic spring element radially therearound, the valve stem seal being configured to support the elastic spring element such that it is axially located between the first seal lip and the second seal lip.

2. The valve stem seal according to claim 1, wherein the elastic connection enables movement of the first and second seal lips in a radial direction that is perpendicular to the axial direction.

3. The valve stem seal according to claim 2, wherein the base body and the first and second seal lips are all integrally made as one piece from the same seal material, and
    wherein the elastic connection is formed from the same seal material and is configured as a connecting bridge that connects the first and second seal lips with the base body.

4. The valve stem seal according to claim 3, wherein the second seal lip is disposed on an arm extending away from the elastic connection in the axial direction.

5. The valve stem seal according to claim 4, wherein the base body includes at least one third seal lip configured to sealingly contact the valve stem guide, a second axial end of the support element that is proximate to the at least one third seal lip has a radial portion extending therefrom towards the valve stem.

6. The valve stem seal according to claim 5, wherein:
    the elastic spring element is configured to exert an elastic spring force on the first seal lip and/or second seal lip in a radially inward direction, wherein the second axial end of the support element is free of seal material.

7. The valve stem seal according to claim 6, wherein the elastic spring element is a garter spring.

8. The valve stem seal according to claim 7, wherein the support element is made of an inelastic material that is different from the material of the first and second seal lips and is configured to rigidly affix the base body on the valve stem guide so that the base body is not axially moveable during operation of the valve stem seal.

9. The valve stem seal according to claim 8, wherein the elastic connection extends at least partially beyond a terminal end of the support element in the axial direction.

10. The valve stem seal according to claim 1, wherein the base body and the first and second seal lips are all integrally made as one piece from the same seal material, and
    wherein the elastic connection is formed from the same seal material and is configured as a connecting bridge that connects the first and second seal lips with the base body.

11. The valve stem seal according to claim 1, wherein the second seal lip is disposed on an arm extending away from the elastic connection in the axial direction.

12. The valve stem seal according to claim 1, wherein the base body includes at least one third seal lip configured to sealingly contact the valve stem guide.

13. The valve stem seal according to claim 1, further comprising:
    at least one spring element configured to exert an elastic spring force on the first seal lip and/or second seal lip in a radially inward direction.

14. The valve stem seal according to claim 13, wherein the at least one spring element is a garter spring.

15. The valve stem seal according to claim 1, wherein the support element is made of an inelastic material that is different from the material of the first and second seal lips and is configured to rigidly affix the base body on the valve stem guide so that the base body is not axially moveable during operation of the valve stem seal.

16. The valve stem seal according to claim 15, wherein the elastic connections extends at least partially beyond a terminal end of the support element in the axial direction.

17. A valve assembly comprising:
    a valve stem reciprocally linearly movable in an axial direction and having a first outer diameter,
    an annular valve stem guide having an inner diameter matched to the first outer diameter and including a seal seat having a second outer diameter, and
    the valve stem seal according to claim 1,
    wherein the base body is fixedly connected to the seal seat of the annular valve stem guide and
    the first and second seal lips resiliently elastically contact the valve stem in its radial direction.

18. The valve assembly according to claim 17, wherein a ratio of the second outer diameter to the first outer diameter falls within the range of 1.05-2.0:1.

19. A valve stem seal comprising:
an annular base portion configured to be disposed around and fixedly connected with a seal seat of a stationary valve stem guide that guides reciprocal linear movement of a valve stem therein,
an annular first seal lip configured to sealingly contact the valve stem around its entire circumference such that the first seal lip is oil-tight,
an annular second seal lip spaced in an axial direction from the first seal lip in the direction of the base body and configured to sealingly contact the valve stem around its entire circumference, wherein a first portion of the second seal lip that is configured to contact the valve stem has a radial cross section that is more rounded than a second portion of the first seal lip that is configured to contact the valve stem,
an annular elastic bridge resiliently connecting the first and second seal lips to the base body, the elastic bridge being configured to enable radial movement of the first and second seal lips so as to follow radial movements of the valve stem relative to the valve stem guide without breaking the sealing contact of the first and second seal lips with the valve stem, wherein no material is interjected into the annular elastic bridge of the valve stem seal between the base body and the second seal lip, and wherein a radial cross section of the annular elastic bridge defines only a single concave section between the base body and the second seal lip, and
a support element substantially surrounding the base body of the valve stem seal wherein one of the group of the base body and the combination of the base body and the elastic bridge contacts the entire inner surface of the support element, an axial end of the support element proximate to the annular first seal lip and the annular second seal lip does not have a radially extending portion that protrudes into another part of the valve stem seal,
the valve stem seal being configured to receive an elastic spring element radially therearound, the valve stem seal being configured to support the elastic spring element such that it is axially located between the first seal lip and the second seal lip.

20. The valve stem seal according to claim 19, further comprising:
a garter spring encircling the first seal lip and/or the second seal lip and applying a radially-inward force thereto, and
the support element being made of an inelastic material configured to rigidly affix the base body to the valve stem guide so that the base body is not axially moveable during operation of the valve stem seal,
wherein the elastic bridge extends at least partially beyond a terminal end of the support element in the axial direction and
the annular base portion comprises a plurality of radially-inwardly directed third seal lips configured to sealingly contact the valve stem guide.

* * * * *